United States Patent [19]

Tsuru

[11] 4,299,400
[45] Nov. 10, 1981

[54] SEALING BOOTS

[75] Inventor: Mario Tsuru, Yokosuka, Japan

[73] Assignee: Nissan Motor Co., Ltd., Yokohama, Japan

[21] Appl. No.: 118,079

[22] Filed: Feb. 4, 1980

[30] Foreign Application Priority Data

Feb. 7, 1979 [JP] Japan .............................. 54-13689[U]

[51] Int. Cl.³ .............................................. F16J 15/52
[52] U.S. Cl. .................................. 277/212 FB; 74/18
[58] Field of Search ...................... 74/18, 18.1, 18.2; 277/212 R, 212 FB, 207 R; 403/50, 51

[56] References Cited

U.S. PATENT DOCUMENTS 1,959,259  5/1934  Zerk ..................................... 74/18 X
3,279,832  10/1966  Bergman ............................... 403/51
4,132,422  1/1979  Sankey et al. ................. 277/212 FB

FOREIGN PATENT DOCUMENTS 1525900  9/1969  Fed. Rep. of Germany ...... 277/212 FB
2242860  3/1976  Fed. Rep. of Germany .
425363  5/1967  Switzerland .......................... 403/51

Primary Examiner—Robert S. Ward, Jr.
Attorney, Agent, or Firm—Lowe, King, Price & Becker

[57] ABSTRACT

A sealing boot to be mounted on a constant velocity joint of a vehicle having a case with concave portions. The sealing boot comprises serrations on the inner peripheral surface to fit edges of the concave portions. The sealing boot is fastened by a fastening means to establish satisfactory sealing.

3 Claims, 3 Drawing Figures

SEALING BOOTS

BACKGROUND OF THE INVENTION

The present invention relates to a sealing boot of a joint, and more especially relates to a constant velocity joint of a drive shaft or the like of a vehicle.

In general such a sealing boot may be mounted on an objective rigid structure, for instance on a rigid body having circular cross-section or a generally convex shaped curved cross-section by means of a securing band or the like by fastening from the outside thereof.

FIGS. 1 and 2 show one example of the sealing boot of a conventional type equipped on a constant velocity joint. In this example, there are formed three concave portions at the outer periphery of the objective rigid structure, or the housing under an object to decrease the overall weight or others.

FIGS. 1 and 2 show a tri-board type and sliding type constant velocity joint. In the figures, reference numeral 1 designates a housing formed integrally with a first shaft 2 at its end portion. This first shaft 2 is to be coupled with another second shaft 4. A spider 3 is formed integrally with said second shaft 4 at its end portion. Three spider shafts 5 are provided on the spider 3 to extend radially and each spaced apart at a 120° angle from others on the periphery of the spider 3. A roller 6 is provided on each one of the spider shafts 5 about a needle 7 in a manner freely rotatable and slidable thereon. Three grooves 8 are provided on the housing 1 at a location of 120° angle separation to extend in an axial direction and to support the rollers 6 to freely rotate therein. A cover 9 is arranged to fit on the outer circumference of the housing 1. Sealing boot 10 is arranged to cover the second shaft 4 and the joint. Both mounting portions 10a and 10b at the ends of the sealing boot 10 are fixed by respective fastening bands 11 and 12 on the cover 9 and the second shaft 4 respectively.

The mounting portions 10a and 10b of the sealing boot are generally made to have thick walls and a shape to fit the outer contour of the objective rigid structure and to have a small clearance therebetween to allow easy mounting and are fastened thereto by the fastening means. If the objective structure, such as the cover 9, is circular shaped, the fastening force of the fastening band may distribute uniformly among the outer wall of the boot and a complete sealing can be obtained. However, when the concave portions or the grooves are formed on the outer periphery of the housing 1 for reducing the weight and hence the cost or for other purposes as shown in FIG. 2, the cover 9 is of irregular shape to match the outer shape of the joint. In such a case, generally the cover 9 has a non-uniform shape due to the machining tolerance and especially because it has non-uniform surface finishing. Under such condition, a disadvantage appears in that the sealing boot 10 may not suitably fit onto the cover 9 in the circumferential direction at a connecting portion between the convex portion 1a and the concave portion 1b of the cover 9, namely at the edge portions 1c of the concave portion 1b. By the insufficient close fitting of the boot 10 against the cover 9, a desired complete sealing cannot be obtaned.

SUMMARY OF THE INVENTION

The present invention is to improve the abovementioned disadvantage of conventional sealing boots.

According to the present invention, the sealing boot is made easily collapsible at a position facing against the edge portion 1c of the concave portion 1b of the cover 9 so as to allow tolerance in the manufacturing accuracy of the objective structure or the cover and to obtain a sufficient sealing.

DESCRIPTION OF THE PREFERRED EMBODIMENT

The invention will now be described by referring to an embodiment as illustrated in the accompanied drawings.

Figure 1:
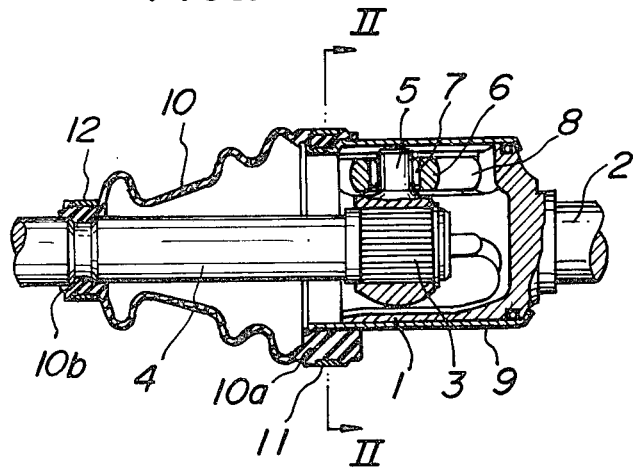
FIG. 1 shows a longitudinal cross-section of a conventional sealing boot applied onto a constant velocity joint.
Figure 2:
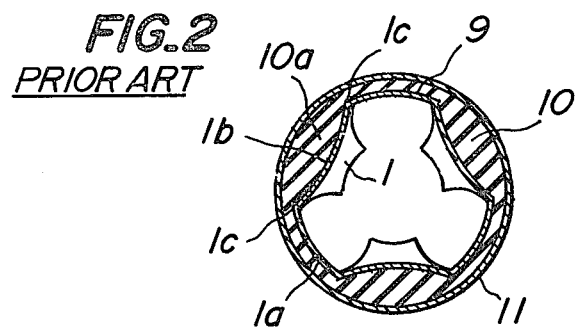
FIG. 2 is a cross-sectional view along line II—II in FIG. 1.
Figure 3:
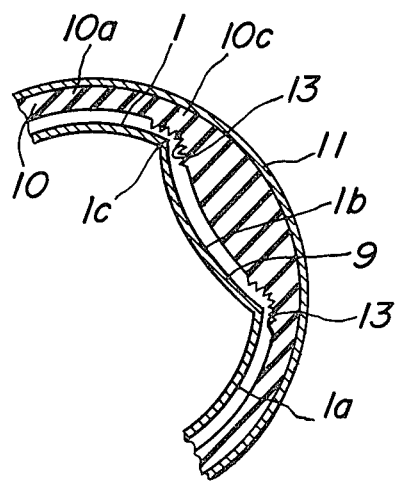
FIG. 3 is a partial enlarged cross-section of the sealing boot made in accordance with the present invention.

FIG. 3 shows an embodiment, in which serrations 13 are provided on the inner surface of the mounting portion 10a of the boot 10 at corner portions 10c which are facing just opposite to the respective edge portion 1c of the concave portion 1b or the joint portion between the convex portion 1a and the concave portion 1b of the cover 9 in order to make the mounting portion 10a easily collapsible. By making the corner portions 10c easily collapsible, the edge portion 1c of the concave portion 1b of the cover 9 becomes sufficiently close against the serrations 13 of the mounting portion 10a of the sealing boot when the mounting portion 10a is fastened against the cover 9 by means of the outer fastening band 11.

According to the present invention, the sealing between the sealing boot and the objective rigid structure becomes quite satisfactory even in the case of the existence of some fitting tolerances between them by providing the above-mentioned serrations on the inner peripheral surface of the mounting portion of the sealing boot at positions fitting against the edges of the concave portion of the objective rigid structure and by fastening the sealing boot from the outside by means of a fastening band or the like. In accordance with the present invention, the machining tolerance of the objective rigid structure can be decreased, which might lead to lowering the cost by the easiness of the manufacture.

Various modifications may be possible without departing from the scope of the invention as claimed in the appended claims.

What is claimed is:

1. A sealing boot having a mounting portion to be mounted on a rigid objective structure provided with at least one concave portion, the sealing boot being fastened against the structure by a fastening means, the improvement wherein the sealing boot comprises serrations on an inner surface of said mounting portion at a position facing against the edge portion of the concave portion of the rigid objective structure.

2. A sealing boot as claimed in claim 1, wherein the rigid objective structure is provided with three concave portions.

3. A sealing boot as claimed in claim 1, wherein the sealing boot is mounted on a constant velocity joint of a vehicle.

* * * * *